Patented Nov. 24, 1953

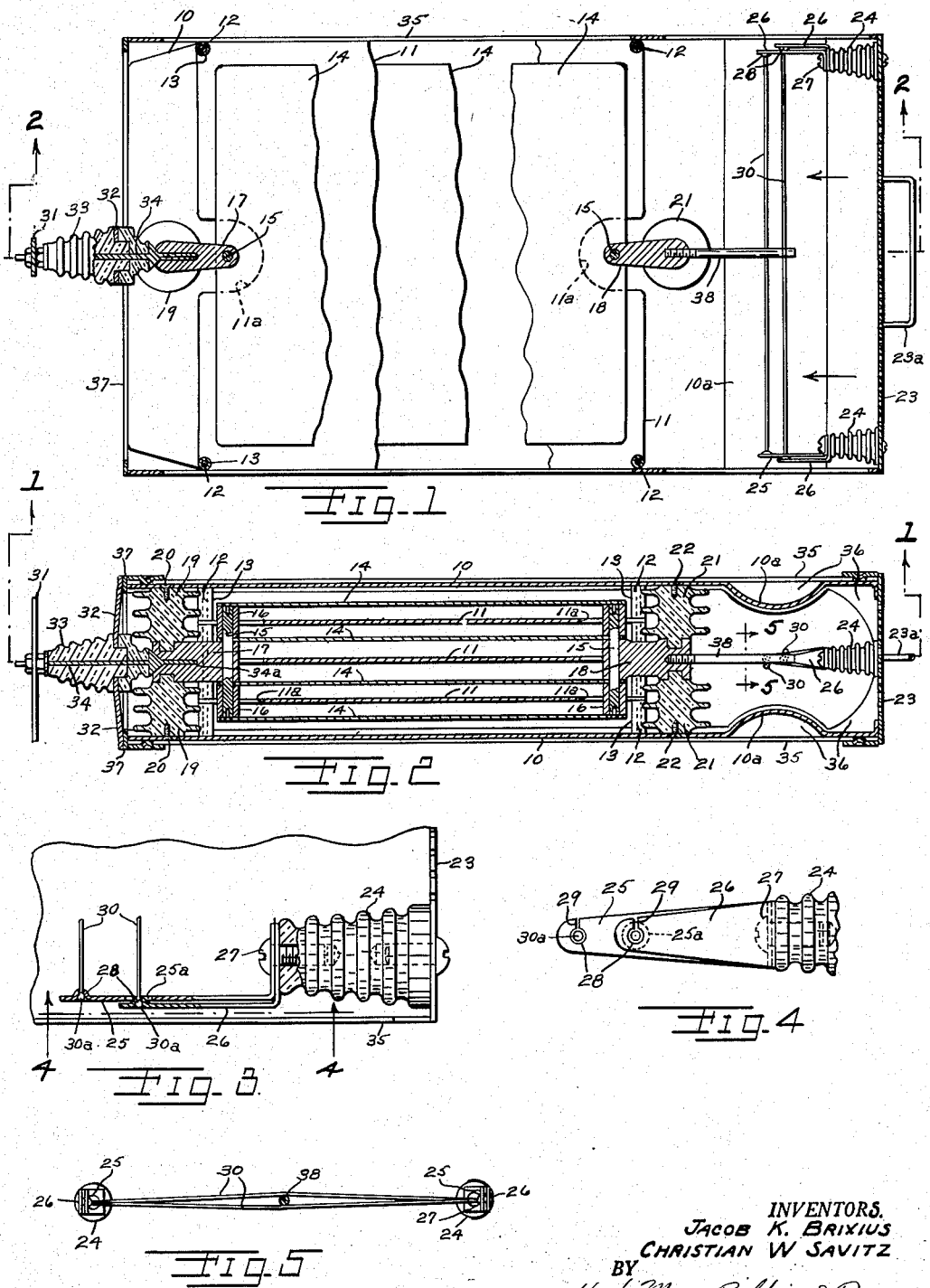

2,660,260

UNITED STATES PATENT OFFICE 2,660,260

SUPPORT FOR CHARGING ELECTRODES FOR ELECTROSTATIC FILTERS

Jacob K. Brixius, Cleveland, and Christian W. Savitz, South Euclid, Ohio, assignors to Air-Maze Corporation, Cleveland, Ohio, a corporation of Delaware Application August 10, 1951, Serial No. 241,306

3 Claims. (Cl. 183—7)

1

This invention relates to improvements in a support for charging electrodes for electrostatic filters.

One of the objects of the present invention is to improve an electrostatic filter cell having collector plates charged with electricity of opposite sign and having upstream therefrom a fine wire charging electrode, the improvement consisting of insulator supports for said charging electrode substantially outside of the flow of the gaseous stream through the filter so as to minimize impedance of the flow.

Another object of the present invention is to charge a fine wire electrode of the character mentioned in the preceding parapraph solely by means of a rod extending upstream from the collector plates and having no positive physical connection with the electrode.

Still another object of the present invention is to support a plurality of fine wire charging electrodes from the insulators mentioned above in a manner to hold each electrode taut independently of the other.

Other objects and advantages of our invention will be apparent from the accompanying drawings and description and the essential features thereof will be set forth in the appended claims.

In the drawings,

Fig. 1 is a central sectional view taken along the line 1—1 of Fig. 2 showing a filter cell embodying our invention;

Fig. 2 is a transverse sectional view of the same taken along the line 2—2 of Fig. 1;

Fig. 3 is a fragmental view enlarged taken at the lower left-hand corner of Fig. 1;

Fig. 4 is a fragmental view taken along the line 4—4 of Fig. 3; while

Fig. 5 is a fragmental sectional view taken along the line 5—5 of Fig. 2.

While our invention might be incorporated in a number of electrostatic filter cells, we have chosen to show the same as embodied in a cell of the type described and claimed in the copending application of Christian W. Savitz, Serial No. 64,642 filed December 10, 1948 for an "Electrostatic Filter," to which reference may be had for details omitted here.

Reference may be had to our copending application, Serial No. 241,305, filed August 10, 1951 for another arrangement for supporting and charging fine wire electrodes upstream from a set of collector plates.

The electrostatic cell shown in Figs. 1 and 2 is like that shown and described in the above mentioned copending application of Savitz in

2 that it provides a set of grounded collector plates comprising a pair of outside plates 10 and a set of inside plates 11. These plates are held together by four bolts 12 which extend through cylindrical spacers 13. The side plates 10 have upstream portions 10a bent inwardly to provide grounded electrodes opposite the fine wire charging electrodes as will presently appear. Another set of charged collector plates 14 are positioned alternately between and parallel to the grounded plates 10 and 11. The plates 14 are shorter and narrower than the plates 11 as clearly shown in Fig. 1. The plates 14 are electrically connected and supported along their horizontal center line by means of bolts 15. Spacers 16 hold the plates 14 in proper position. Each bolt 15 is supported respectively by an electrically conducting bracket 17 at the rear end and similar bracket 18 at the front end. The bracket 17 is supported by insulators 19 which are rigidly secured to the plates 10 by the screws 20. The bracket 18 is rigidly supported by the insulators 21 which in turn are rigidly secured to the side plates 10 by means of screws 22. The plates 11 are cut away as indicated at 11a so as to give a proper air gap between these grounded plates and the charged bolts 15 and spacers 16.

The means for supporting the charging electrodes upstream from the collector plates will now be described. A perforated plate 23 rigidly connects plates 10 at the upstream end of the cell. On the vertical center line of the cell, insulators 24 are mounted on plate 23 near the top and bottom of the cell respectively. It will be noted that insulators 24 are narrow across the cell and practically in horizontal alinement with the top and bottom edges of plates 14. Thus, insulators 24 impede stream flow through the cell very slightly. L-shape brackets 25 and 26 of spring metal are mounted on the downstream end of each insulator 24 by a screw 27. At the downstream end of each bracket is a cup-shape depression 28 opening outwardly toward the top or bottom of the cell. A narrow slot 29 extends from each depression laterally to the edge of the bracket. An opening 25a in each bracket 25 is coaxial with its depressions 28 in brackets 26.

One or more fine wire charging electrodes 30 are supported taut between the pairs of brackets 25 and 26. Preferably, for reasons stated in the above mentioned copending application of Savitz, two of these fine wire charging electrodes are provided. The depressions 28 in brackets 25 and 26 are so spaced as to properly position the two electrodes 30 parallel to each other and parallel to the upstream edges of plates 11 and 14. Each wire electrode 30 has an enlarged end 30a received in one of the cup depressions 28. The slots 29 permit the positioning of the electrodes as shown in the drawings.

The manner of charging the cell will now be described. As clearly described in the above mentioned copending application of Savitz, a suitable power pack provides high voltage substantially unidirectional current to a bus bar 31. Rigidly supported from the cell frame by brackets 32, is an insulator 33. Passing axially of this insulator is a conductor 34 electrically connected at one end with the bus bar 31 and terminating in a conducting prong 34a. The cell is slidable horizontally in a frame comprised of the side members 35, top and bottom plates 36, and frame members 37 at the downstream end. A handle 23a is attached rigidly to plate 23 for manipulation of the cell. As the cell slides into the position shown in Figs. 1 and 2, the electrically conducting bracket 17 has a recess which receives tightly the prong 34a so that the high voltage unidirectional current is transmitted from the bus bar 31 through conductor 34, bracket 17 and bolts 15 and spacers 16 to the plates 14. At the forward end of the plates 14 they are electrically connected to the member 18. Threaded in bracket 18 is a rod 38 of electrically conducting material with the axis of the rod parallel to the general direction of air flow through the cell as indicated by the arrows in Fig. 1. As clearly shown in Figs. 2 and 5, the rod 38 is frictionally engaged between the fine wire electrodes 30 in a manner which is sufficient to transmit an electrical charge from rod 38 to the wires 30. Thus, the wire electrodes 30 are supported and charged without any appreciable interference with stream flow through the cell.

What we claim is:

1. In an electrostatic filter cell having a set of electrically charged collector plates alternately positioned between a set of grounded collector plates, said plates terminating in upstream edges generally normally to the direction of flow through said cell of a gaseous stream to be filtered, two outermost plates of said set of grounded plates extending upstream beyond said set of charged plates, a frame member connecting the upstream ends of said two extended plates, insulators rigidly mounted at opposite ends of said frame member centrally of said cell and extending downstream from said frame member, said insulators respectively approximately opposite the top and bottom edges of said plates, a bracket extending downstream from each of said electrodes and generally parallel to the direction of stream flow, at least one of said brackets having spring characteristics normal to the path of stream flow, each of said brackets having a through opening centrally of said cell, and there being a slot from each said opening to an edge of said bracket, a fine wire charging electrode supported between said brackets and generally parallel to said upstream edges, said fine wire adapted to pass through said slots and having enlargements on its opposite ends too large to pass through said openings, said enlargements spaced to lie against the outermost faces of said brackets respectively and to hold said wire in tension between said brackets, and means for electrically energizing said fire wire electrode.

2. The combination of claim 1 including a pair of said brackets supported from each of said electrodes, the brackets of each pair being parallel, and said openings in the outermost bracket of each pair of brackets being spaced from said insulators a distance differing from the spacing of said openings in the innermost bracket of each pair of brackets so as to hold two fine wire electrodes in the center of said cell and parallel to each other.

3. In an electrostatic filter cell, a frame member, insulators rigidly mounted at opposite ends of said frame member centrally of said cell and extending downstream from said frame member, a bracket extending downstream from each of said electrodes and generally parallel to the direction of stream flow through said cell, at least one of said brackets having spring characteristics normal to the path of stream flow, each of said brackets having a through opening centrally of said cell, and there being a slot from each said opening to an edge of said bracket, a fine wire charging electrode supported between said brackets, said fine wire adapted to pass through said slots and having enlargements on its opposite ends too large to pass through said openings, and said enlargements spaced to lie against the outermost faces of said brackets respectively and to hold said wire in tension between said brackets.

JACOB K. BRIXIUS.
CHRISTIAN W. SAVITZ.

References Cited in the file of this patent

UNITED STATES PATENTS

| Number | Name | Date |
| --- | --- | --- |
| 2,275,001 | Anderson | Mar. 3, 1942 |
| 2,486,521 | Dahlman | Nov. 1, 1949 |
| 2,585,138 | Landgraf | Feb. 12, 1952 |